United States Patent [19]
Drnevich

[11] Patent Number: 5,802,875
[45] Date of Patent: Sep. 8, 1998

[54] METHOD AND APPARATUS FOR CONTROL OF AN INTEGRATED CROYOGENIC AIR SEPARATION UNIT/GAS TURBINE SYSTEM

[75] Inventor: Raymond Francis Drnevich, Clarence, N.Y.

[73] Assignee: Praxair Technology, Inc., Danbury, Conn.

[21] Appl. No.: 864,343

[22] Filed: May 28, 1997

[51] Int. Cl.[6] ........................................... F25J 3/02
[52] U.S. Cl. ................................................ 62/656
[58] Field of Search ........................ 62/646, 656, 640

[56] References Cited

U.S. PATENT DOCUMENTS

| | | |
|---|---|---|
| 4,224,045 | 9/1980 | Olszewski et al. . |
| 4,806,136 | 2/1989 | Kiersz et al. . |
| 5,081,845 | 1/1992 | Allam et al. . |
| 5,386,686 | 2/1995 | Chretien et al. . |
| 5,421,166 | 6/1995 | Allam et al. . |
| 5,437,160 | 8/1995 | Darredeau et al. ............... 62/656 |
| 5,501,078 | 3/1996 | Paolino . |
| 5,582,036 | 12/1996 | Drnevich et al. .................. 62/656 |
| 5,722,259 | 3/1998 | Sorensen et al. .................. 62/646 |

OTHER PUBLICATIONS

*Air Separation Plants for Gasification Combined Cycles,* Prosser et al., Dec. 7, 1994.

*Concepts of Prenflo–Based IGCC Power Plants,* Buskies et al., Oct. 28, 1987.

Primary Examiner—Christopher Kilner
Attorney, Agent, or Firm—Stanley Ktorides

[57] ABSTRACT

A method for controlling an integrated cryogenic air separation unit (ASU)/gas turbine system which maintains peak power output in spite of ambient temperature variations. The ratio of air flow to the ASU from a source of supplemental air and a turbine compressor is adjusted to compensate for changes in ambient air temperature and to maintain air flow to the ASU at a level which enables production of the product, a fuel stream is controlled to maintain gaseous output from a combustor at a maximum practical temperature and a flow ratio of waste nitrogen and fuel fed to the combustor is maintained substantially constant.

8 Claims, 2 Drawing Sheets

5,802,875

METHOD AND APPARATUS FOR CONTROL OF AN INTEGRATED CROYOGENIC AIR SEPARATION UNIT/GAS TURBINE SYSTEM

FIELD OF THE INVENTION

This invention relates to a control method and apparatus for maintaining a gas turbine, employed in combination with a cryogenic air separation unit (ASU), operating at its peak output over a wide range of ambient air temperatures and, more particularly, to a control method which adjusts a supplemental air source to maintain a required air flow to the ASU, over the wide range of ambient air temperatures.

BACKGROUND OF THE INVENTION

Integrated, gasification combined-cycle systems for power generation are highly capital intensive and are required to maximize electric power output to be competitive with alternative methods of power generation. Integration of an ASU with a gas turbine has shown the potential for improved cost and performance results, when compared to non-integrated systems.

Full integration of air separation with gasification combined-cycle systems usually involves extraction of the feed air for the ASU from the gas turbine's air compressor, eliminating need for a separate air compressor for the ASU. Partial integration usually involves use of a supplemental air compressor to provide part of the air required for the ASU.

After oxygen and the nitrogen required for the gasification system have been separated from the air by the ASU, waste nitrogen is returned to the gas turbine to maintain output, using a return nitrogen compressor. Generally, the waste nitrogen is mixed with the fuel feed prior to entry into a combustor. Air is then mixed with the nitrogen/fuel mixture in the combustor. The hot gas output from the combustor provides a feed stream for the turbine expander portion of the gas turbine. The waste nitrogen feed provides a quenching effect on the oxidation reaction which occurs in the combustor and aids in maintaining temperatures within the combustor within acceptable temperature limits so as to control $NO_X$ production.

It is known that variations in the temperature of the inlet air feed (i.e., ambient air temperature) can cause substantial variation in the output of an integrated ASU/gas turbine system. More specifically, the output of a gas turbine is directly related to its air inlet temperature. Normally, the cold air temperatures which occur in winter enable larger masses of feed air to be supplied. By contrast, when the inlet air temperature rises, such as in the summer, considerably less mass of air is compressed, causing a decrease in overall power output of the system.

Various methods have been suggested in the prior art to maintain the output of integrated ASU/gas turbine units. U.S. Pat. No. 4,224,045 to Olszewski et al., entitled "Cryogenic System for Producing Low Purity Oxygen", describes a cryogenic system for production of low purity oxygen through a fractional distillation of liquefied air. The waste nitrogen's flow from the ASU is compressed and is fed as part of the gas flow to a turbine expander to enable an increase in energy output.

U.S. Pat. No. 5,386,686 to Chrëtien et al., entitled "Process for the Operation of a Gas Turbine Group and the Production of at Least One Air Gas" describes a combined ASU/gas turbine. Chrëtien et al. claim that the best method for controlling the gas turbine at its maximum output is to operate the nitrogen return compressors from zero flow at low ambient temperatures to maximum flow at higher ambient temperatures. Under these conditions, the specific heat of combustion of the fuel-nitrogen mixture at the inlet to a combustor can vary by a factor as high as 5–1. This control method thereby makes combustor design and operation difficult to achieve, due to the large possible variations of combustion conditions therein.

Accordingly, it is in object of this invention to provide an improved method for control of an integrated ASU/gas turbine system, wherein operating parameters are maintained within a range to enable optimum output of the system, notwithstanding variations in ambient temperature.

SUMMARY OF THE INVENTION

A method for controlling an integrated air separation unit (ASU)/gas turbine system maintains peak power output independent of ambient temperature variations. The gas turbine system includes a turbine compressor for receiving a flow of feed air, a combustor and a turbine expander which receives a gaseous output from the combustor. The ASU receives a flow of feed air from both the turbine compressor and a source of supplemental air, and provides a product stream and a waste nitrogen stream. The method includes the steps of: (i) adjusting a ratio of air flow to the ASU from the source of supplemental air and the turbine compressor, to compensate for changes in ambient air temperature and to maintain air flow to the ASU at a level which enables production of the product; (ii) providing a fuel stream to the combustor; (iii) providing a feed of the waste nitrogen stream to the combustor; and (iv) controlling the fuel stream to maintain the gaseous output from the combustor at a maximum temperature that is consistent with maintaining maximum power output from the gas turbine system, while maintaining substantially constant a ratio of the waste nitrogen feed and the fuel feed.

DETAILED DESCRIPTION OF A PREFERRED EMBODIMENT

Figure 1:
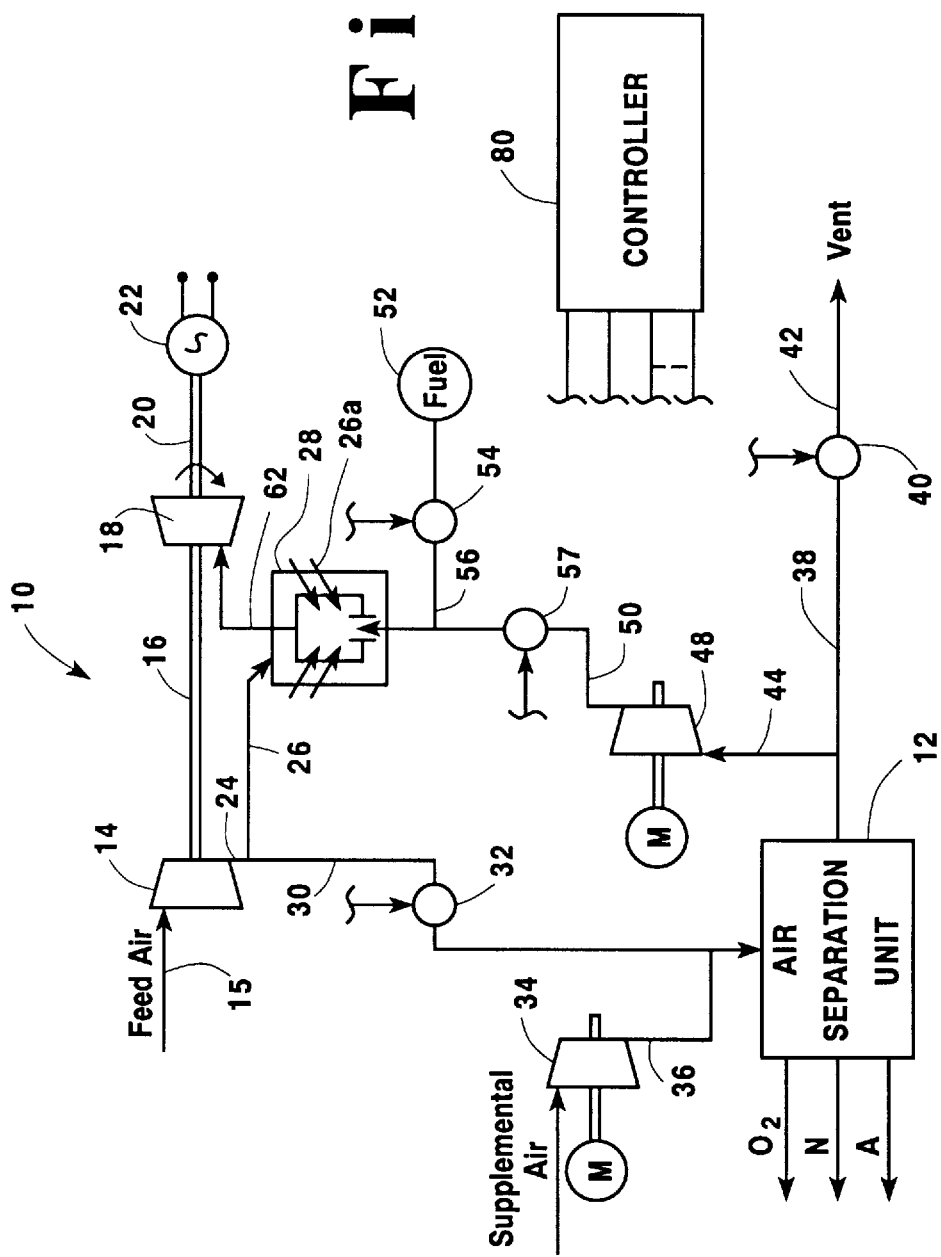
FIG. 1 is a schematic diagram of an integrated ASU/gas turbine incorporating the invention hereof.

A partially integrated ASU/gas turbine system is shown in FIG. 1 and comprises gas turbine assembly 10 and ASU 12. Gas turbine assembly 10 comprises a turbine compressor 14, to which is fed an inlet flow 15 of feed air at ambient temperature. A shaft 16 connects turbine compressor 14 to turbine expander 18 which is, in turn, coupled via a further shaft 20 to a generator 22.

Compressed air is fed from turbine compressor 14 via a flow means 24 and a flow means 26 to a combustor 28. Flow means 24 further diverts a portion of the compressed air to ASU 12, via flow means 30 and control valve 32. A source of supplemental air for ASU 12 is provided from turbine compressor 34, via flow means 36. The supplemental air flow from compressor unit 34 is determined either by its guide vanes, speed control, by a recirculation control valve or by a combination of these options. The combined diverted and supplemental air flows are provided as a combined air feed to ASU 12.

Product outputs from ASU 12 are one or more of oxygen, argon and nitrogen. The constituent units within ASU 12, such as one or more cryogenic rectification columns, are well known to those skilled in the art and will not be further described as they are not directly relevant to this invention. ASU 12 provides a waste nitrogen stream via flow means 38 and valve 40 to a vent 42. The waste stream comprises mainly nitrogen (approximately 98%) with a minor proportion of oxygen (approximately 2%). A portion of the waste nitrogen stream from ASU 12 is fed, via flow means 44, to a compressor unit 48. Compressor unit 48 compresses the nitrogen waste stream and supplies it, via flow means 50, through control valve 51 to combustor 28.

A fuel source 52 provides a fuel stream, via control valve 54 and flow means 56, to flow means 50 where it combines with the compressed nitrogen waste stream and enters combustor 28. The fuel may be any fluid fuel, examples of which include methane, natural gas and products of coal gasifiction. The combustion air flow 26a is combined with the fuel feed and waste nitrogen in combustor 28 and assures sufficient oxygen at the feed end of combustor 28 to provide proper operation. The air is mixed with the fuel/nitrogen mixture via nozzle(s) in combustor 28 and the air flow rate is controlled by the pressure differential across the nozzle(s).

The hot gas output from combustor 28 is supplied via flow means 62 to turbine expander 18 to cause a rotation thereof and a powering of gas turbine 10 and generator 22.

Figure 2:
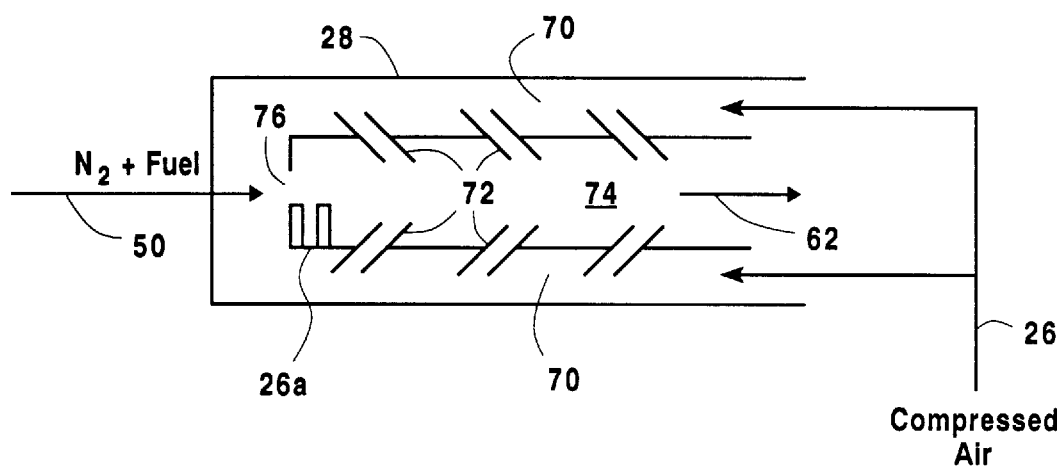
FIG. 2 is a schematic diagram of an embodiment of a combustor employed in the system of FIG. 1.

Turning briefly to FIG. 2, a schematic diagram shows the annular-type construction of combustor 28. Compressed air is fed from turbine compressor 14 via flow means 26 and enters annulus 70 of combustor 28. Therein, the compressed air stream is split into multiple streams which enter, via openings 72, as cooling air into combustion chamber 74. The fuel/waste nitrogen mixture enters combustor 28 at an opposite end thereof, via flow means 50, is mixed with air stream 26a which enters through nozzle 76 and is then injected into the primary combustion zone of chamber 74. The nitrogen flow in flow means 50 provides both mass gas flow and acts as a diluent for temperature control purposes.

To maintain maximum output from gas turbine 10, the flow rate of the hot gas stream in flow means 62 must be maintained at a maximum allowable temperature and flow rate. The maximum net output of a gas turbine is usually set by mechanical constraints, such as torque limits of the shaft. Maximum efficiency is achieved at the maximum turbine inlet temperature of the hot gas stream in flow means 62. Turbine inlet temperature is limited by the materials of construction and the cooling techniques used in turbine expander 18.

At low ambient air feed temperatures, turbine compressor 14 has more capacity than is needed to maintain gas turbine 10 at its maximum output.

Consequently, there is excess capacity for use by ASU 12. However, as the ambient air temperature increases, the air mass per unit of time that is compressed by turbine compressor 14 decreases and, at some temperature, insufficient mass is available to maintain gas turbine 10 at its maximum output, while providing sufficient air flow to ASU 12. The deficiency in mass flow is made up by the supplemental air flow from compressor 34.

The necessary control functions for the valves and other items illustrated in FIG. 1 are derived from a controller 80 which operates to control one or more of the various gas streams to accomplish the necessary mass flow rates. Controller 80 is thus operated to cause the various flow states in the system of FIG. 1 to enable the operation of the system at its maximum output level (in accordance with, for example, the parameter values given in Table 1, below). That is, controller 80 serves (1) to manipulate valve 32 to control stream 30, (2) to control the guide vanes, speed control and/or recirculation control valve of compressor 34 to control stream 36, (3) to manipulate valve 40 and/or valve 51 to control waste nitrogen stream 50, and/or (4) to manipulate valve 54 to control fuel stream 56. Any suitable controller may be used to carry out the control functions required in the practice of this invention.

Table 1 illustrates three inlet air temperature conditions (i.e., 20 degrees Fahrenheit, 59 degrees Fahrenheit and 95 degrees Fahrenheit); and the parameters which are required to maintain a constant net turbine output from turbine expander 18.

TABLE 1

| | Ambient Temperature | | |
| --- | --- | --- | --- |
| | 20 F. | 59 F. | 95 F. |
| Feed air flow, klbs/hr Stream 15 | 3,684 | 3,435 | 3,155 |
| Diverted air flow, klbs/hr Stream 30 | 737 | 464 | 263 |
| Supplemental air flow, klbs/hr, Stream 36 | 0 | 249 | 422 |
| Additive N$_2$ flow, klbs/hr Stream 44 | 534 | 517 | 497 |
| Fuel flow, klbs/hr Stream 56 | 364 | 353 | 338 |
| Flow Ratio, N$_2$ to fuel | 1.47 | 1.47 | 1.47 |
| Net turbine output, MW | 190 | 190 | 190 |

Table 1 summarizes an example of flow rates through various portions of the system of FIG. 1 that are needed to maintain constant maximum output from turbine expander 18, as a function of ambient temperature. In the example, the flow of fuel is a function of ambient temperature and the allowable temperature in stream 62, and the ratio of fuel to waste nitrogen is kept constant. It should be noted that the nitrogen to fuel ratio may vary somewhat due to control system variations and due to transition conditions during system changes. Generally, the nitrogen to fuel ratio will be substantially constant, i.e. within ±20% and usually ±5%. Steady state operation will maintain the nitrogen to fuel flow ratio substantially constant. Generally the nitrogen to fuel flow ratio will be within the range of from 1.22 to 1.77, preferably within the range of from 1.40 to 1.55.

Adjustment of air feed from supplemental compressor 34 allows ASU 12 to operate at conditions needed to provide oxygen for the gasification system, without reducing the power of the gas turbine system. By maintaining a constant ratio of nitrogen to fuel at the input to combustor 28, given varying ambient temperature conditions, a constant flow of a maximum temperature gaseous output is supplied to turbine expander 18, with a resultant maximum power output to generator 22.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for controlling an integrated cryogenic air separation unit (ASU)/gas turbine system, said gas turbine system including a turbine compressor for receiving a flow of feed air, a combustor and a turbine expander receiving a gaseous output from the combustor, said ASU receiving a flow of feed air from both said turbine compressor and a source of supplemental air, and providing a product stream and a waste nitrogen stream, said method comprising the steps of:

(a) adjusting a ratio of air flow to said ASU from said source of supplemental air and said turbine compressor, to compensate for changes in ambient air temperature and to maintain air flow to said ASU at a level which enables production of said product;

(b) providing a first feed of a fuel stream to said combustor;

(c) providing a second feed of said waste nitrogen stream to said combustor; and (d) controlling said first feed of said fuel stream to maintain said gaseous output from said combustor at a maximum temperature that is consistent with maintaining maximum power output from said gas turbine system, while maintaining substantially constant a ratio of said second feed and first feed.

2. The method as recited in claim 1, wherein the ratio of said second feed and first feed is maintained constant by adjustment of said second feed.

3. The method as recited in claim 1, wherein step (d) controls said first feed of said fuel stream by taking into account an ambient temperature of feed air to said turbine compressor.

4. The method as recited in claim 1, wherein step (c) includes the substep of compressing said waste nitrogen stream.

5. A system for controlling an integrated cryogenic air separation unit (ASU)/gas turbine to provide a maximum power output from the gas turbine under conditions of varying ambient feed air temperatures, said system comprising:

gas turbine means including a turbine compressor for receiving a flow of feed air, a combustor and a turbine expander coupled to receive a gaseous output from the combustor;

a fuel source for feeding a fuel stream to said combustor;

a source of supplemental air;

an ASU coupled to receive a flow of feed air from both said turbine compressor and said source of supplemental air, for providing a waste nitrogen stream to said combustor;

control means for:

(i) adjusting a ratio of air flows to said ASU from said source of supplemental air and from said turbine compressor, to compensate for changes in ambient air temperature so as to maintain a combined air flow to said ASU at a level which enables production of said product;

(ii) controlling said fuel stream to maintain said gaseous output from said combustor at a maximum temperature that is consistent with maintaining maximum power output from said gas turbine means, while maintaining constant a ratio of said waste nitrogen stream and said fuel stream.

6. The system as recited in claim 5, wherein the control means maintains constant the ratio of said waste nitrogen stream and said fuel stream by adjustment of said waste nitrogen stream.

7. The system as recited in claim 5, wherein the control means controls the fuel stream by taking into account an ambient temperature of feed air to said turbine compressor.

8. The system as recited in claim 5, further comprising:

compressor means for compressing said waste nitrogen stream before a feed thereof to said combustor.

* * * * *